(12) United States Patent
Sasur et al.

(10) Patent No.: US 10,940,409 B2
(45) Date of Patent: Mar. 9, 2021

(54) COMPOSITE FILTER CARTRIDGE

(71) Applicant: Parker-Hannifin Corporation, Cleveland, OH (US)

(72) Inventors: Timothy M. Sasur, Newington, CT (US); Justin R. Pribanic, Broad Brook, CT (US); Jonathan D. Moore, Manchester, CT (US); Chandrakant Siddharam Kotale, Manchester, CT (US)

(73) Assignee: Parker-Hannifin Corporation, Cleveland, OH (US)

( * ) Notice: Subject to any disclaimer, the term of this patent is extended or adjusted under 35 U.S.C. 154(b) by 594 days.

(21) Appl. No.: 14/775,799

(22) PCT Filed: Mar. 14, 2014

(86) PCT No.: PCT/US2014/027029
§ 371 (c)(1),
(2) Date: Sep. 14, 2015

(87) PCT Pub. No.: WO2014/152168
PCT Pub. Date: Sep. 25, 2014

(65) Prior Publication Data
US 2016/0023133 A1 Jan. 28, 2016

Related U.S. Application Data

(60) Provisional application No. 61/787,064, filed on Mar. 15, 2013.

(51) Int. Cl.
*B01D 27/00* (2006.01)
*B01D 27/08* (2006.01)
(Continued)

(52) U.S. Cl.
CPC .......... *B01D 27/005* (2013.01); *B01D 27/08* (2013.01); *B01D 46/0015* (2013.01); *B01D 46/2414* (2013.01); *B01D 2201/293* (2013.01)

(58) Field of Classification Search
CPC .. B01D 27/005; B01D 27/08; B01D 46/0015; B01D 46/2414; B01D 2201/293
See application file for complete search history.

(56) References Cited

U.S. PATENT DOCUMENTS 5,080,787 A * 1/1992 Brown ................. B01D 27/005
210/232
5,084,170 A * 1/1992 Janik ...................... B01D 17/00
210/232
(Continued)

FOREIGN PATENT DOCUMENTS

CN 2571465 Y 9/2003
CN 201055727 Y 5/2008
(Continued)

OTHER PUBLICATIONS

Supplementary European Search Report dated Oct. 11, 2016 (European Patent Application No. 14767375.0).
(Continued)

*Primary Examiner* — Waqaas Ali
(74) *Attorney, Agent, or Firm* — Alix, Yale & Ristas, LLP

(57) ABSTRACT

Cartridge components are configured to trap the upper end of a concave housing portion to define an enclosure surrounding a filter element. A disclosed embodiment includes a concave metal housing portion and plastic cartridge components, but other materials may be employed. An upper end cap spans the open end of the housing portion and defines at least one fluid flow aperture. A retainer surrounds the housing portion and is secured to the first component, with engagement features on the housing portion trapped between (Continued)

the upper end cap and retainer. The upper end cap and retainer may be secured to each other by spin welding, threads, adhesive or other suitable means. The outside circumference of one or both of the upper end cap and retainer may be provided with lugs, threads, bosses or other features to interface with complimentary features on the head for securing the cartridge to a head.

8 Claims, 5 Drawing Sheets

(51) Int. Cl.
  *B01D 46/00* (2006.01)
  *B01D 46/24* (2006.01)
  *B01D 27/07* (2006.01)

(56) References Cited

U.S. PATENT DOCUMENTS

| | | | |
|---|---|---|---|
| 6,595,372 B1* | 7/2003 | Minowa | B01D 29/21 |
| | | | 210/440 |
| 6,740,234 B1 | 5/2004 | Williams et al. | |
| 6,863,184 B2 | 3/2005 | Ochi et al. | |
| 7,147,110 B2 | 12/2006 | Clausen et al. | |
| 2001/0037969 A1* | 11/2001 | Stankowski | B01D 35/30 |
| | | | 210/348 |
| 2007/0170103 A1 | 7/2007 | Fick | |
| 2007/0187306 A1* | 8/2007 | Pecca | B01D 35/30 |
| | | | 210/120 |
| 2010/0155321 A1* | 6/2010 | Sasur | B01D 29/21 |
| | | | 210/232 |
| 2010/0288688 A1* | 11/2010 | Bryson | B01D 27/103 |
| | | | 210/254 |
| 2011/0017649 A1 | 1/2011 | Sasur | |

FOREIGN PATENT DOCUMENTS

| | | |
|---|---|---|
| EP | 0575196 A1 | 12/1993 |
| EP | 0657199 A2 | 6/1995 |
| EP | 1964600 B1 | 12/2013 |
| JP | 2000042317 A | 2/2000 |
| WO | 9103301 A1 | 3/1991 |
| WO | 2005011838 A1 | 2/2005 |
| WO | 2010002798 A1 | 1/2010 |

OTHER PUBLICATIONS

International Search Report and Written Opinion dated Jul. 2, 2014 (PCT/US2014/027029).
Indian Examination Report dated Jan. 2, 2019 for Indian Patent Application No. 2666/MUMNP/2015.

* cited by examiner

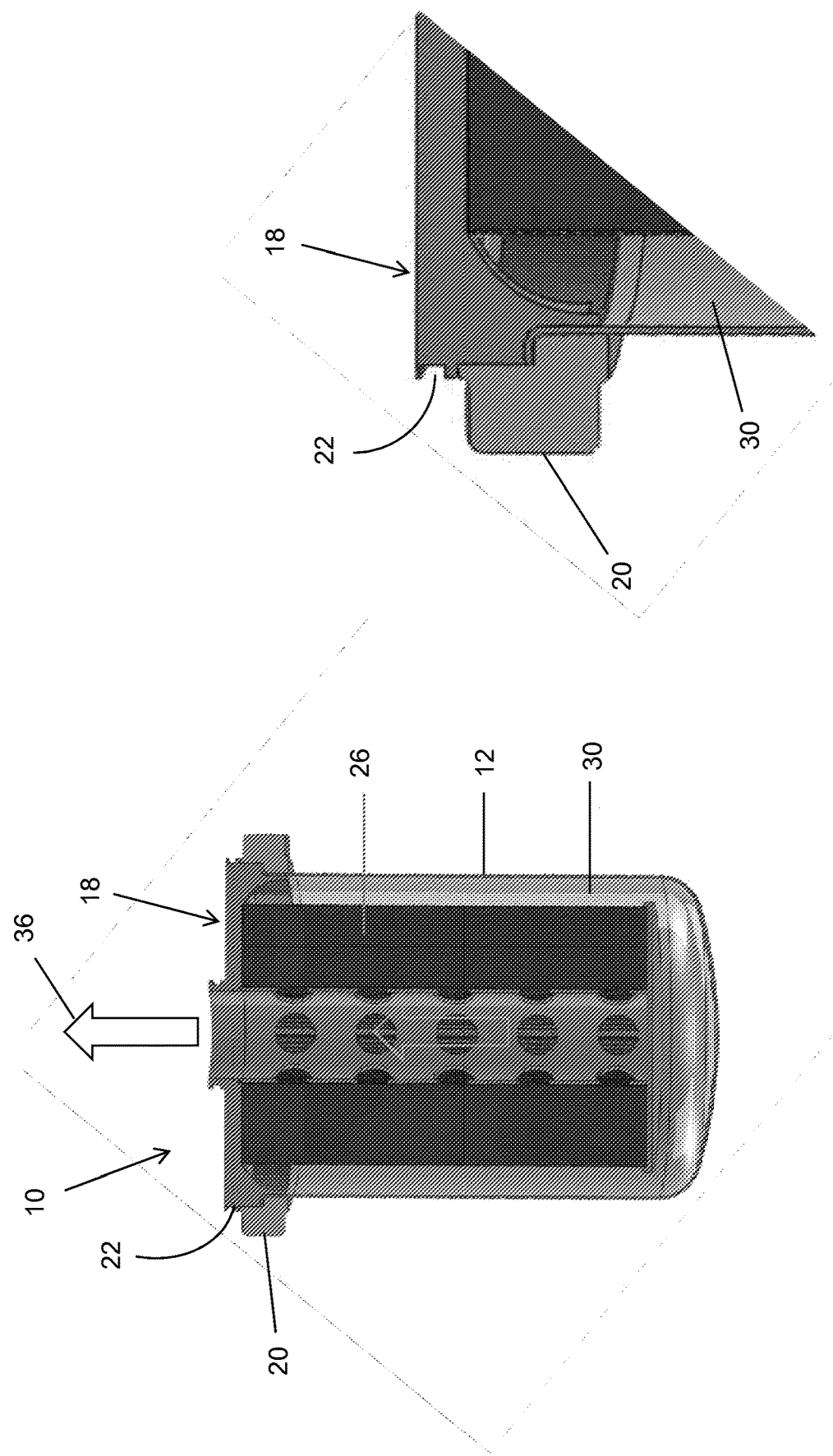

COMPOSITE FILTER CARTRIDGE

BACKGROUND

The present disclosure relates to replaceable filter cartridges employed for fluid filtration and more particularly to such filter cartridges constructed of disparate materials.

Twist-on, spin-on, disposable type filters are used in numerous liquid and pneumatic applications throughout the agricultural, mobile, commercial and industrial market places. Many prior art twist-on disposable filter products are manufactured using a thin gauge metal can, or housing, made by the deep-draw forming of malleable metals. The prior art cartridges may employ a stamped steel or cast plate to secure the can to a fluid distribution system filter head. This construction can impose limitations on arrangements for securing the cartridge to a head.

For example, the metal can/metal end plate configuration may not permit threaded engagement between the cartridge and the filter head at the periphery of the upper end of the cartridge. This so called "big mouth" design may be more efficient in terms of overall material use and can provide a structurally enhanced interface between a cartridge and a filter head. A robust cartridge/head connection may be important in a high pressure application.

There is a need for an alternative filter cartridge construction that is adaptable to a variety of cartridge/head mounting configurations.

SUMMARY

A cartridge having a composite construction including a drawn metal can and plastic components enclosing the attachment end of the cartridge provides greater flexibility with regard to the configuration of the cartridge-to-head connection.

Plastic components are configured to trap the upper end of a metal can to define a fluid tight cartridge housing surrounding a filter media arrangement. The plastic components can be molded in a variety of materials and configurations, greatly enhancing adaptability of the composite cartridge to a variety of cartridge-to-head connection configurations. A first plastic component encloses the end of the cartridge and defines at least one fluid flow aperture communicating with the fluid distribution system via the associated filter head. A second plastic component surrounds the outside of the metal can and is secured to the first component, with the open upper end of the metal can trapped between the first and second plastic components. The first and second plastic components may be secured to each other by spin welding, threads, adhesive or other suitable means. The plastic components are configured to carry seals to prevent fluid leakage from within the cartridge at the metal/plastic interface and the cartridge-to-head connection. The outside circumference of one or both plastic components may be provided with lugs, threads, bosses or other features to interface with complimentary features on the head for securing the cartridge to the head.

BRIEF DESCRIPTION OF THE DRAWINGS

FIG. 3 is a sectional view of the embodiment of the composite filter cartridge of FIG. 1;

FIG. 4 is an enlarged sectional view of the interface between the metal can and plastic components of the composite filter cartridge of FIG. 1;

DETAILED DESCRIPTION OF THE DISCLOSED EMBODIMENTS

Figure 1:
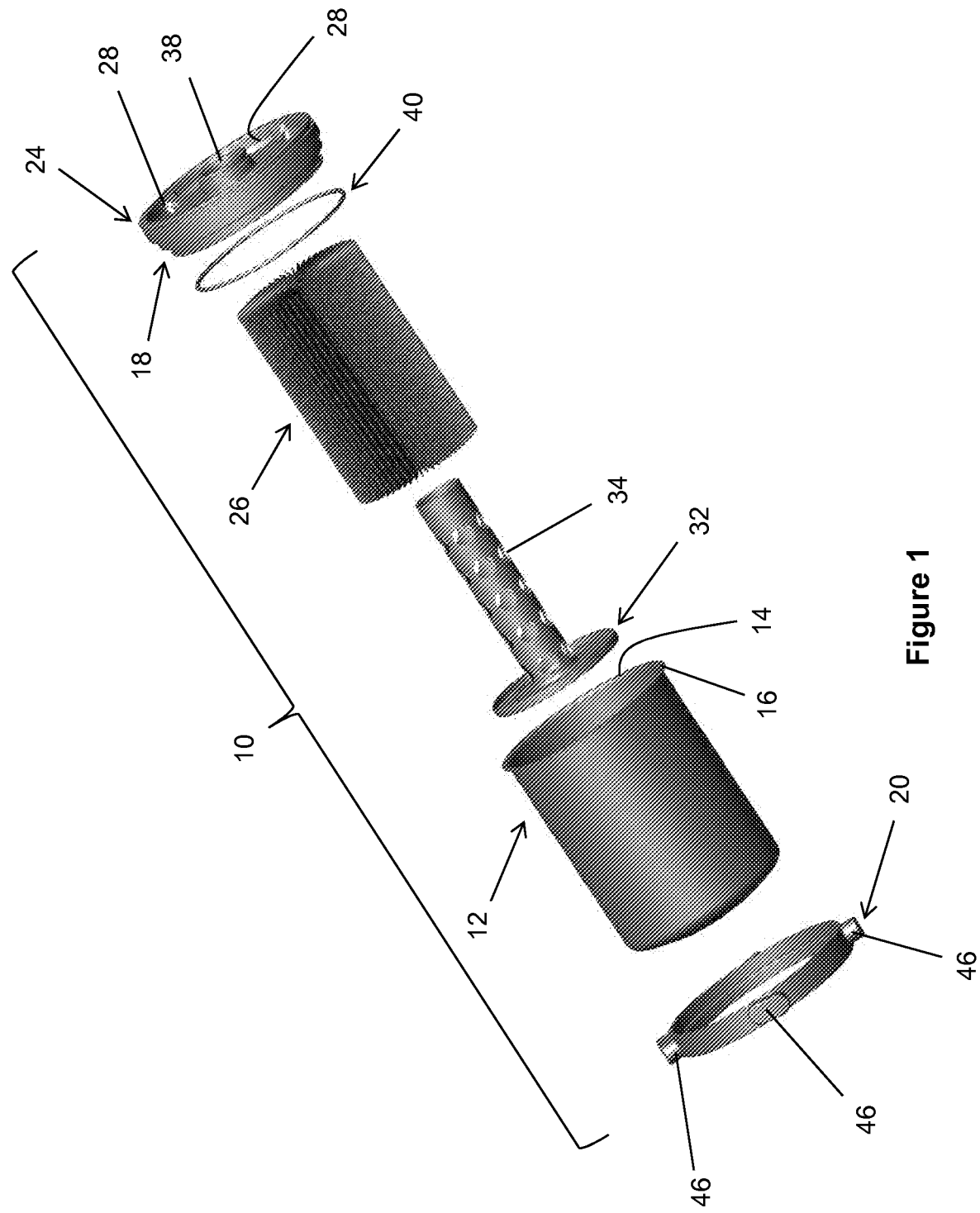
FIG. 1 is an exploded perspective view of an embodiment of a composite filter cartridge according to aspects of the disclosure.

An exemplary composite filter cartridge will now be described with reference to FIGS. 1-7. FIG. 1 is an exploded view of the disclosed composite filter cartridge, designated by reference numeral 10 showing the several components. An element can 12 of drawn steel encloses the non-attachment (lower) end of the cartridge 10. The element can 12 upper end 14 is open and includes an outwardly flared lip 16. The flared lip 16 provides a feature for engagement between the upper end cap 18 and ring shaped retainer 20. The flared lip 16 illustrated in FIGS. 1-7 is an example of a configuration that can be trapped between the plastic components 18, 20, but the disclosed concept is not limited to the disclosed outwardly flared continuous lip. Other configurations, such as an inwardly flared lip, a discontinuous lip or formed features such as bumps or steps are also compatible with the disclosed composite filter cartridge. The upper end of the can may be outwardly flared into a U-shaped bend (not shown) toward the closed end of the cartridge, which is then trapped between the plastic components. If the plastic components 18, 20 are joined by spin welding, it will be necessary for the plastic components to have an interface that permits rotation of one plastic component relative to the other, but the can 12 may remain fixed with respect to one or the other plastic component 18, 20. Adhesive bonding or solvent welding between the two plastic components 18, 20 may permit additional design freedom with respect to configuration of the interface between the two plastic components, since relative rotation between the parts is not required.

In the disclosed embodiments, the upper end cap includes an O-ring groove 22 facing radially outward to support an O-ring (or other seal member) 24 that will seal against a complimentary surface of the filter head (not shown). The upper end cap 18 is configured to directly receive an upper end of the pleated filter media 26. The upper end cap 18 also defines fluid flow openings 28 directing incoming unfiltered fluid to the area 30 surrounding (radially outward of and below) the filter media 26. A lower end cap 32 and center tube 34 complete the filter element arranged inside the cartridge 10. The axial ends of the pleated filter media are adhesively bonded and sealed to the upper and lower end caps, respectively by polyurethane adhesive, or other joining techniques known in the art. Alternatively, the upper and lower end caps 18, 32 and media 26 can be heat-staked. The lower end cap 32 is closed so that the only flow path through the filter cartridge 10 requires incoming fluid to pass through the filter media 26, where particulates are removed. The lower end cap 32 and center tube 34 may be molded as a single unit, or molded separately and joined by any suitable method. If the fluid is diesel fuel, then the filter media 26 may be formulated to separate entrained water from the fuel in addition to removing particulates. The center tube 34 is perforated, permitting fluid to enter the area within the center tube, where an axial outward flow path 36 allows filtered fluid to exit the cartridge 10 via an axial fluid flow opening 38 defined at the center of the upper end cap 18.

The disclosed filter media 26 is illustrated as a longitudinally extending "tube" of pleated media having a circular sectional shape. The important attribute of the filter media are that it form a complete separation between dirty fluid entering the cartridge 10 and clean fluid that has passed through the media 26. Any sectional shape is compatible with this objective, and the illustrated configuration should be seen as one of many suitable configurations. The media 26 is secured to itself to form a closed loop separating dirty fluid from clean fluid that has passed through the media 26. Axial ends of the media 26 are secured to the end caps 18, 34 by adhesive or other means that form a fluid-tight bond between the media 26 and the end caps to force fluid through the media 26.

Figure 2:
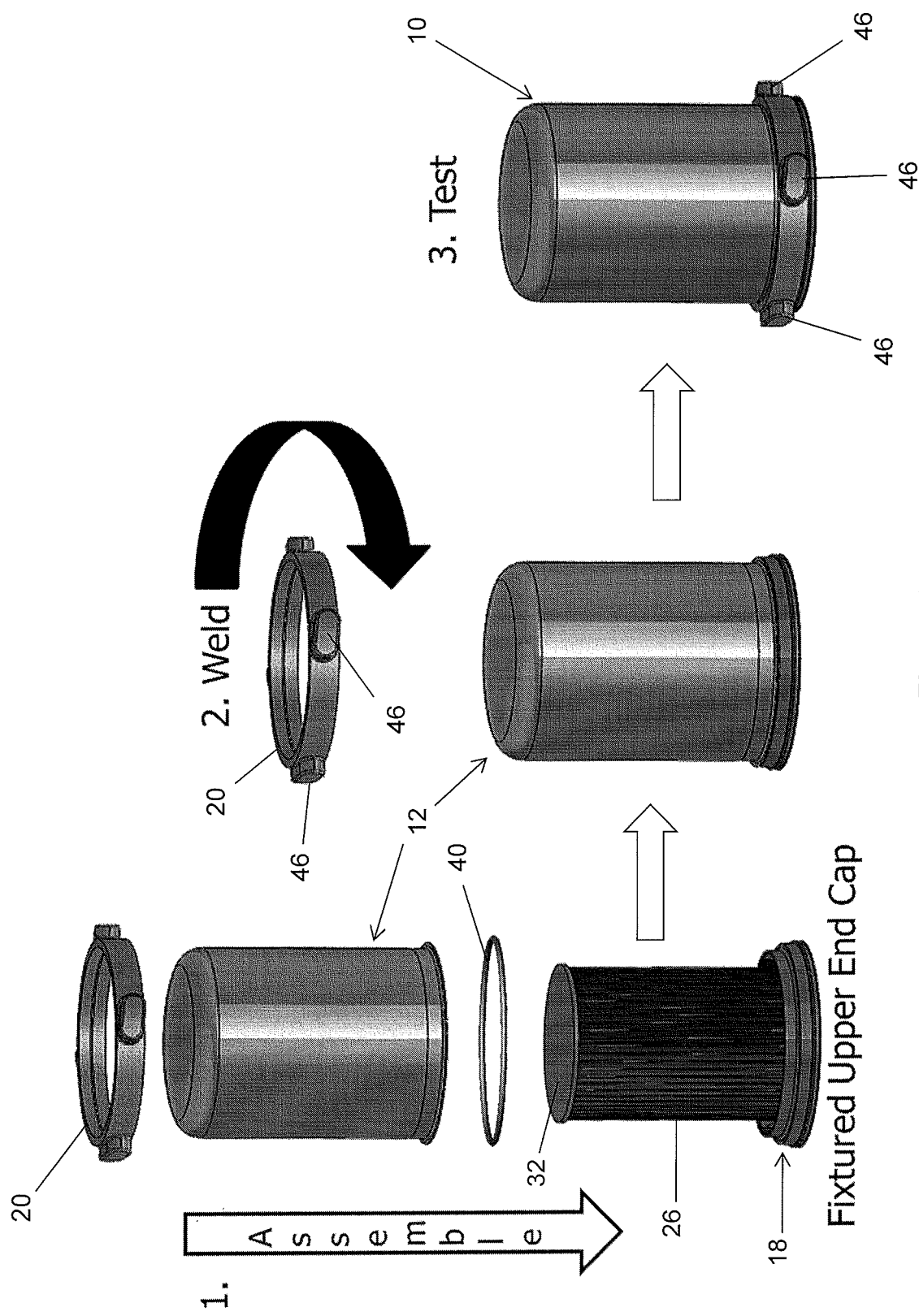
FIG. 2 illustrates an exemplary assembly order and technique for the composite cartridge of FIG. 1.

One method of assembly of the disclosed embodiment will be described with reference to FIG. 2. The upper end cap 18, lower end cap 32, filter media 26 and center tube 34 are assembled as described above and the resulting subassembly is mounted in a fixture. The can 12 and retainer 20 are placed over the fixtured sub-assembly and the retainer is rotated relative to the assembly to spin weld the retainer 20 to the upper end cap 18. A seal 40 may be arranged between the can 12 and upper end cap 18 and/or between the can 12 and the retainer 20 to seal fluid within the cartridge 10 during use.

FIGS. 3 and 4 are sectional views of an embodiment of the disclosed composite filter cartridge 10. The flared lip 16 at the open end 14 of the can 12 is trapped between the upper end cap 18 and ring-shaped retainer 20. The upper end cap 18 and retainer 20 overlap to define a spin weld zone. A simple cylindrical overlap is shown, but an overlap with more surface area may be used to enhance the spin welding bond. It may be possible to form threads (not shown) on the plastic components so the upper end cap 18 and retainer 20 are threaded and then adhesively bonded or solvent welded.

Figure 6:
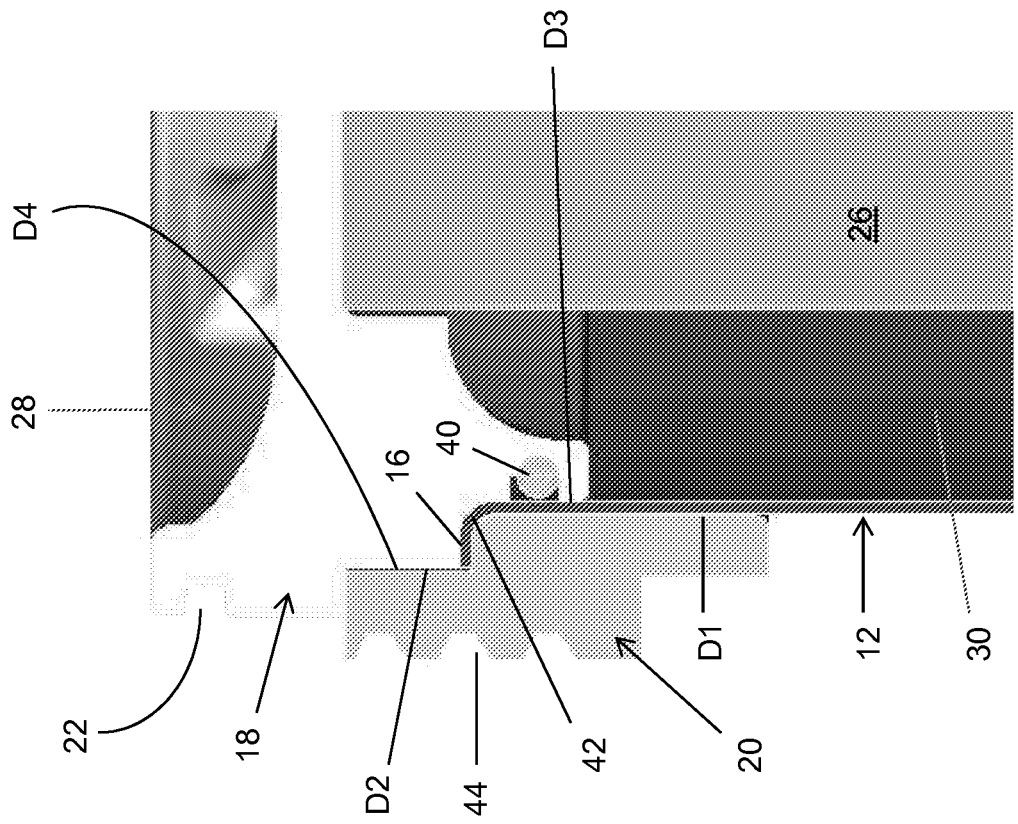
FIG. 6 is an enlarged sectional view of the interface between the metal can and plastic components of another alternative embodiment of a composite filter cartridge according to aspects of the present disclosure.
Figure 5:
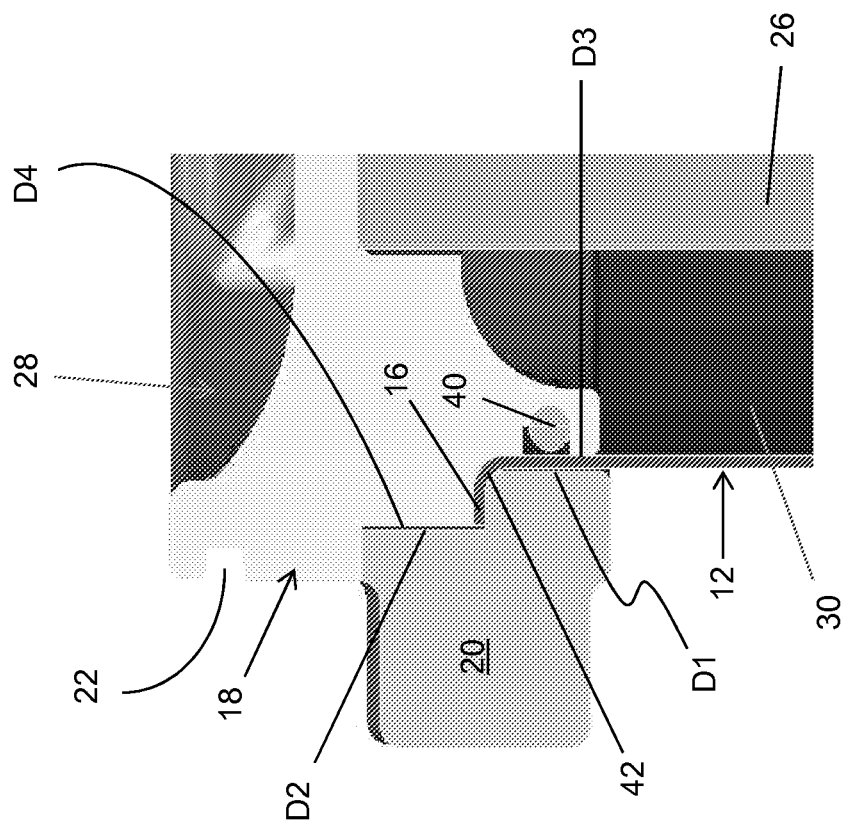
FIG. 5 is an enlarged sectional view of the interface between the metal can and plastic components of an alternative embodiment of a composite filter cartridge according to aspects of the disclosure.
Figure 7:
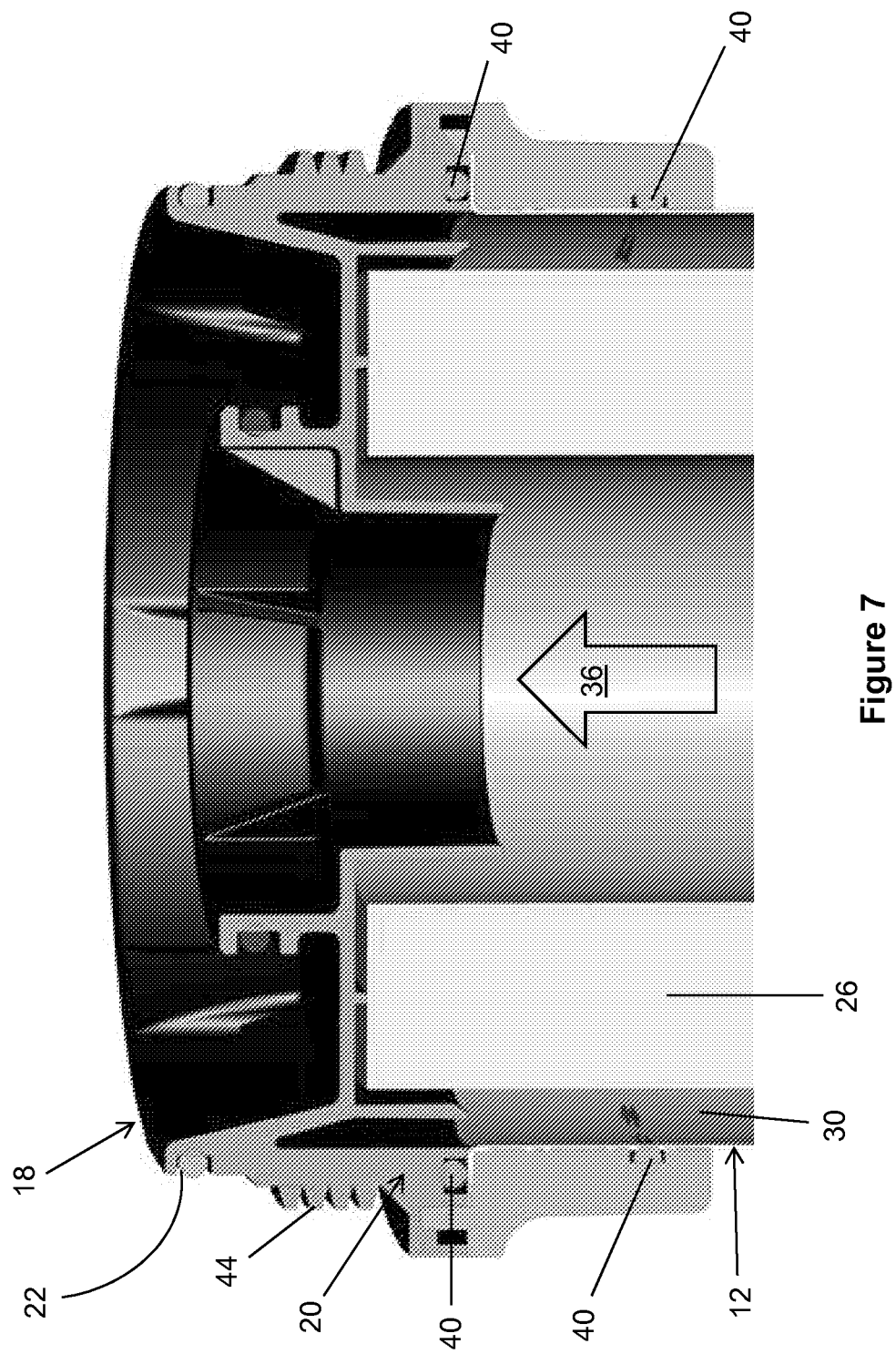
FIG. 7 is an enlarged sectional view of the interface between the metal can and plastic components of another alternative embodiment of a composite filter cartridge according to aspects of the present disclosure.

FIGS. 5 and 6 are enlarged sectional views of the interface between the can 12, retainer 20 and upper end cap 18 in alternative embodiments of the disclosed composite filter cartridge 10. It will be observed that the retainer 20 includes an inside surface having a first diameter D1 and a second, larger diameter D2, forming a shoulder 42. The upper end cap 18 has diameters D3 and D4 which are configured to trap the upper end 14 and flared lip 16 of the can 12 against the retainer shoulder 42. When the retainer 20 and the upper end cap 18 are welded or otherwise joined, the can is trapped and retained between the retainer 20 and upper end cap 18. A seal 40 is arranged between the upper end cap 18 and the inside surface of the can 12 to contain fluid inside the cartridge 10. FIG. 7 illustrates an alternative embodiment with a seal 40 between the retainer 20 and the outside surface of the can 12 to contain fluid inside the cartridge 10. An additional seal 40 is positioned between the flared lip 16 and the upper end cap 18, which defines a gland to support the seal 40. In the embodiment of FIG. 7, external threads 44 to couple the cartridge 10 to a head (not shown) are defined on the outside peripheral surface of the upper end cap, above the retainer 20. It will be apparent to those skilled in the art that attachment features may be arranged on the peripheral outside surfaces of either the retainer 20 or the upper end cap 18 as needed.

Molded plastic components provide maximum freedom with regard to the configuration of the interface between the cartridge 10 and a filter head (not shown). The disclosed embodiment of the retainer 20 shown in FIGS. 1 and 2 includes four lugs arranged to engage complementary ramps in a filter head without rotation of the filter element for engagement. Alternatively, the retainer may be provided with threads, bosses or other configurations to engage a filter head. FIG. 6 illustrates threads 44 defined on the outside of the retainer 20 for connection with complementary threads on a filter head (not shown). Retainer 20 illustrated in FIGS. 1 and 2 includes a plurality of lugs 46 configured to engage complementary ramps of a bayonet type connection with a base (not shown). The retainer 20 provides a broad shoulder facing the closed end of the cartridge that may be used by a mounting collar to support the cartridge against a filter head. Alternatively, the upper end cap 18 may be axially extended above the upper end cap/retainer interface to accommodate features to attach the cartridge to a head such as index or keying features.

The use of the terms "a" and "an" and "the" and similar referents in the context of describing the disclosed embodiments (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. All methods described herein can be performed in any suitable order unless otherwise indicated herein or otherwise clearly contradicted by context. The use of any and all examples, or exemplary language (e.g., "such as") provided herein, is intended merely to better illuminate the disclosed embodiments and does not pose a limitation on the scope of the claims unless otherwise claimed. No language in the specification should be construed as indicating any non-claimed element as essential to the practice of the disclosed embodiments or claimed invention.

Preferred embodiments are described herein, including the best mode known to the inventors for making and using the preferred embodiments. Variations of those preferred embodiments may become apparent to those of ordinary skill in the art upon reading the foregoing description. The inventors expect skilled artisans to employ such variations as appropriate, and the inventors intend for the claimed invention to be practiced otherwise than as specifically described herein. Accordingly, the following claims are intended to encompass all modifications and equivalents of the subject matter of the disclosure as permitted by applicable law. Moreover, any combination of the above-described elements in all possible variations thereof is encompassed by the claims unless otherwise indicated herein or otherwise clearly contradicted by context.

What is claimed is:

1. A composite filter cartridge comprising:
    a concave metal housing defining an interior space having a longitudinal axis, said housing having a closed first end and an open second end, said open second end including an outwardly flared lip;
    a filter media supported within said interior space and surrounding said longitudinal axis between first and second axial ends;
    a first plastic end cap secured to said first axial end of said filter media and having an outside surface configured to engage said outwardly flared lip of said housing, said first plastic end cap spanning said open second end and defining a fluid inlet and a fluid outlet;

a second end cap proximate the closed first end of the housing, wherein the filter media comprises a single filter element extending between the first plastic end cap and the second end cap;

a plastic retainer configured to surround said concave metal housing and including an interior surface cooperating with said outside surface of said first plastic end cap and said outwardly flared lip of said housing, wherein the plastic retainer includes engagement lugs arranged on an outside surface of the plastic retainer, and wherein the engagement lugs are configured to interface with a filter head;

wherein an interface is defined between said outside surface of said first plastic end cap and said plastic retainer, said first plastic end cap is in direct contact with said plastic retainer at said interface, said first plastic end cap and said plastic retainer are permanently joined at said interface, said plastic retainer and first plastic end cap are both engaged with said outwardly flared lip of said housing and secured to each other, thereby securing said housing to said first plastic end cap.

2. The composite filter cartridge of claim 1, wherein said housing is cylindrical, said outwardly flared lip takes the form of a continuous or discontinuous lip at said housing second end.

3. The composite filter cartridge of claim 1, wherein said first plastic end cap and plastic retainer are joined by solvent welding or adhesive bonding.

4. The composite filter cartridge of claim 1, wherein said plastic retainer forms a shoulder facing said housing second end.

5. The composite filter cartridge of claim 1, wherein said first plastic end cap outside surface having first and second diameters, said plastic retainer has second and third diameters defining a shoulder and said outwardly flared lip is trapped against said shoulder when said plastic retainer is joined to said first plastic end cap.

6. The composite filter cartridge of claim 1, comprising a second end cap secured to said filter media second end, said second end cap spanning and closing said filter media second end.

7. The composite filter cartridge of claim 1, wherein the interface defined between said outside surface of said first plastic end cap and said plastic retainer is rotationally symmetrical and said first plastic end cap and said plastic retainer are configured to be joined by spin welding.

8. The composite filter cartridge of claim 1, wherein said interface is radially outward of said outwardly flared lip.

* * * * *